(12) United States Patent
Schmitz et al.

(10) Patent No.: US 11,813,996 B2
(45) Date of Patent: Nov. 14, 2023

(54) POWER CONTROL SYSTEM AND METHOD FOR MODEL VEHICLES

(71) Applicant: TRAXXAS, L.P., McKinney, TX (US)

(72) Inventors: Scott Rollin Michael Schmitz, Lewisville, TX (US); William Huang, McKinney, TX (US)

(73) Assignee: TRAXXAS, L.P., McKinney, TX (US)

( * ) Notice: Subject to any disclaimer, the term of this patent is extended or adjusted under 35 U.S.C. 154(b) by 422 days.

(21) Appl. No.: 17/188,880

(22) Filed: Mar. 1, 2021

(65) Prior Publication Data

US 2021/0269011 A1 Sep. 2, 2021

Related U.S. Application Data

(60) Provisional application No. 62/982,895, filed on Feb. 28, 2020.

(51) Int. Cl.
| | |
|---|---|
| *B60R 16/03* | (2006.01) |
| *G08C 17/02* | (2006.01) |
| *B60W 10/26* | (2006.01) |
| *B60W 50/035* | (2012.01) |
| *B60W 10/08* | (2006.01) |
| *A63H 30/04* | (2006.01) |

(Continued)

(52) U.S. Cl.
CPC ............. *B60R 16/03* (2013.01); *A63H 30/04* (2013.01); *B60W 10/08* (2013.01); *B60W 10/26* (2013.01); *B60W 50/035* (2013.01); *G08C 17/02* (2013.01); *B60W 20/13* (2016.01); *B60W 20/15* (2016.01); *B60W 2050/0297* (2013.01); *B60W 2300/30* (2013.01); *G05D 1/0022* (2013.01)

(58) Field of Classification Search
CPC ........ B60R 16/03; A63H 30/04; B60W 10/08; B60W 10/26; B60W 50/035; B60W 20/13; B60W 20/15; B60W 2050/0297; B60W 2300/30; G08C 17/02; G05D 1/0022
USPC ........................................................ 180/65.8
See application file for complete search history.

(56) References Cited

U.S. PATENT DOCUMENTS 9,043,047 B2 * 5/2015 Feldkamp ............. B60R 25/102
 701/2
9,932,003 B2 * 4/2018 Sato .......................... H02J 9/00
(Continued)

*Primary Examiner* — James A Shriver, II
*Assistant Examiner* — Hilary L Johns
(74) *Attorney, Agent, or Firm* — Daryl R. Wright; Greg Carr

(57) ABSTRACT

An enhanced hybrid battery elimination circuit, power control system, and method for R/C vehicles is provided. The system may include a power input from a vehicle battery and a converted power output to vehicle electronics. The system may also include an enhanced hybrid battery elimination circuit (BEC) electrically coupled to the power input and providing the converted power output and including a linear regulator and a switching regulator connected in parallel to the linear regulator between the power input and the converted power output. The enhanced hybrid BEC further includes a linear electrical decoupler provided between the linear regulator and the converted power output and a switching electrical decoupler provided between the switching regulator and the converted power output. Wherein the switching regulator and the linear regulator are either electrically coupled or decoupled from the output power and/or the input power based upon a monitored voltage level.

17 Claims, 7 Drawing Sheets

(51) Int. Cl.
*B60W 20/13* (2016.01)
*B60W 20/15* (2016.01)
*G05D 1/00* (2006.01)
*B60W 50/029* (2012.01)

(56) References Cited

U.S. PATENT DOCUMENTS

2007/0290657 A1* 12/2007 Cretella .............. H02M 3/1584
323/222
2012/0330481 A1* 12/2012 Feldkamp ............. B60R 25/102
701/2
2015/0224946 A1* 8/2015 Sato ......................... H02J 9/00
307/9.1
2018/0024549 A1* 1/2018 Hurd ................... G05D 1/0016
701/2
2020/0368629 A1* 11/2020 Moss ..................... A63H 17/21

* cited by examiner

POWER CONTROL SYSTEM AND METHOD FOR MODEL VEHICLES

RELATED APPLICATIONS

This application claims the benefit of a related U.S. Provisional Application Ser. No. 62/982,895, filed 28 Feb. 2020, entitled "POWER CONTROL SYSTEM AND METHOD FOR MODEL VEHICLES," to Scott Rollin Michael SCHMITZ et al., the disclosure of which is incorporated by reference herein in its entirety.

BACKGROUND

The following descriptions and examples are not admitted to be prior art by virtue of their inclusion in this section.

Radio Controlled (R/C) model vehicles, model vehicles controlled through a radio link, such as R/C Cars, Planes, Trucks, and Boats, among others, have greatly evolved due to advances in technology, chemistry, and computer science. An early R/C vehicle may have used a variable resistor and nicad (Nickel Cadium) batteries along with a two channel controller in order to remotely accelerate and steer the R/C vehicle. These days, R/C vehicles make use of electronic speed controllers (ESC) and multiple servos to produce a more powerful and realistic driving experience.

An early R/C vehicle may have also had two separate battery systems in order to provide electrical power. Typically the early R/C vehicle would have a high current, high voltage battery system for the electronic motor, and a lower current, lower voltage battery system for the radio receiver, servos, and other electrical systems. However, due to the small interior space of an R/C vehicle, size efficiency is always at a premium. Therefore, Battery Elimination Circuits (BECs) were developed in order to allow a single battery to power both the R/C vehicle's high current motor and the low current radio receiver, servos, and other electrical systems.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An embodiment of the claimed disclosure may include an enhanced hybrid battery elimination circuit (BEC) for a radio controlled vehicle comprising a linear regulator and a switching regulator, connected in parallel to the linear regulator, between a power input and a converted power output. The enhanced hybrid BEC may also include a switching enable/disable system provided between the power input and the switching regulator and a linear enable/disable system provided between the power input and the linear regulator.

The switching enable/disable system may enable the power input to flow to the switching regulator and the linear enable/disable system may disable the power input from flowing to the linear regulator, when a monitored voltage level is above a certain voltage threshold. Conversely, the linear enable/disable system may enable the power input to flow to the linear regulator and the switching enable/disable system may disable the power input from flowing to the switching regulator, when the monitored voltage level is less than or equal to the voltage threshold.

Another embodiment of the claimed disclosure may include a modification of the enhanced hybrid BEC described in the previous embodiment, but further including a switching electrical decoupler provided between the switching regulator and the power output, and a linear electrical decoupler provided between the linear regulator and the power output.

The linear electrical decoupler may electrically decouple the linear regulator from the power output and the switching electrical decoupler may electrically couple the switching regulator to the power output, when the monitored voltage level is above the voltage threshold. However, the switching electrical decoupler may electrically decouple the switching regulator from the power output and the linear electrical decoupler may electrically couple the linear regulator to the power output, when the monitored voltage level is less than or equal to the voltage threshold.

Still another embodiment of the claimed disclosure may comprise a radio controlled vehicle having a power control system that includes a power input from a vehicle battery and a converted power output for vehicle electronics. In addition, the power control system may include an enhanced hybrid battery elimination circuit (BEC) electrically coupled to the power input and producing the converted power output. The enhanced hybrid BEC may include a linear regulator and a switching regulator connected in parallel to the linear regulator, connected to the power input and the converted power output.

The enhanced hybrid BEC may further include a linear electrical decoupler provided between the linear regulator and the converted power output and a switching electrical decoupler provided between the switching regulator and the converted power output. The switching electrical decoupler may electrically couple the switching regulator to the converted power output and the linear electrical decoupler may electrically decouple the linear regulator from the converted power output, when a monitored voltage level is greater than a voltage threshold. Conversely, the linear electrical decoupler may electrically couple the linear regulator to the converted power output and the switching electrical decoupler may electrically decouple the switching regulator from the converted power output, when the monitored voltage level is less than or equal to the voltage threshold.

A further embodiment of the claimed disclosure may comprise a method for producing a converted power output for a radio controlled vehicle that includes electrically coupling a linear regulator and a linear electrical decoupler to a power input and a converted power output. Wherein the linear electrical decoupler is provided between the linear regulator and the converted power output. Additionally, the method includes electrically coupling a switching regulator and a switching electrical decoupler to the power input and the power output, in parallel with the linear regulator and the linear electrical decoupler. The switching electrical decoupler is provided between the switching regulator and the converted power output.

The method may also include electrically decoupling the linear regulator via the linear electrical decoupler from the power output and electrically coupling the switching regulator to the power output via the switching electrical decoupler, when a monitored voltage level is greater than a voltage threshold. Further, the method may include electrically decoupling the switching regulator via the switching electrical decoupler and electrically coupling the linear regulator via the linear electrical decoupler, when the monitored voltage level is less than or equal to the voltage threshold.

Another embodiment of the previously described method may include electrically coupling a switching enable/disable system between the power input and the switching regulator and electrically coupling a linear enable/disable system between the power input and the switching regulator. The switching enable/disable system, switching regulator, and switching electrical decoupler are provided in parallel to the linear enable/disable system, linear regulator, and the linear electrical decoupler.

Additionally, the method may include enabling the power input to flow to the switching regulator via the switching enable/disable system and disabling the power input from flowing to the linear regulator via the linear enable/disable system, when the monitored voltage level is above the voltage threshold. Also, the method may include enabling the power input to flow to the linear regulator via the linear enable/disable system and disabling the power input from flowing to the switching regulator via the enable/disable system, when the monitored voltage level is less than or equal to the voltage threshold.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

The following description will use a radio controlled (R/C) vehicle that is a model car or truck as an example in order to simplify the detailed description. Of course, a person of skill in the art would recognize that many of the teachings and concepts in this disclosure may be applied to other forms of R/C vehicles, such as boats, planes, helicopters, drones, motorcycles, and other radio controlled devices. Referring generally to the PRIOR ART system schematic in FIG. 1, in early R/C vehicles the power control systems 100 were relatively simple. For example, most power control systems 100 typically comprised two batteries, a high voltage, high current motor battery 110 and a lower voltage, lower current radio battery 120.

Figure 1:
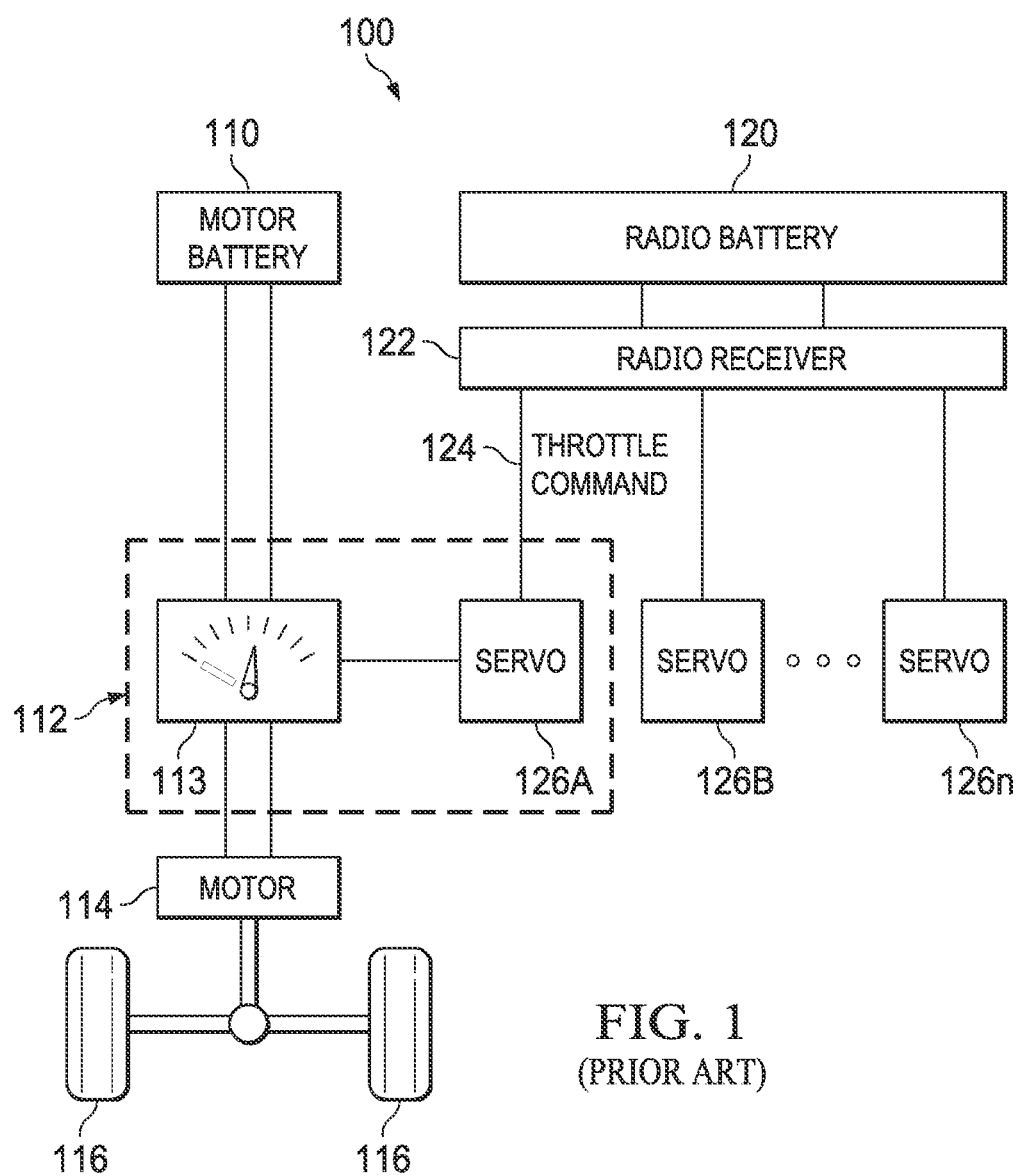
FIG. 1 is a PRIOR ART schematic illustration of a previous power control systems using two batteries.

The motor battery 110 was electrically coupled to a throttle control 112 (see the broken line section of FIG. 1). In some cases, the throttle control 112 comprised something as simple as a variable resistor 113, which in turn was controlled by a servo 126A. The power output of the throttle control 112 was electronically coupled to an electric motor 114. The motor 114 in turn would drive the wheels 116. In this illustrative example, the R/C vehicle is shown with 2 driven wheels (2WD), although 4 wheel drive (4WD) or higher could also be applicable. In some cases, there may also be applications in which a single motor 114 drives a single wheel or other types of propulsion units such as a rotor or propeller.

Since one of the multiple objectives of the early power control systems 100 of may have been to produce the greatest R/C vehicle speed, the motor battery 110 was typically larger and provided a higher current output than the radio battery 120. In addition, the electrical coupling between the motor battery 110, throttle control 112, and motor 114, were all generally configured to have a relatively high current capacity as compared to the electrical systems provided in the rest of the power control system 100.

As shown in FIG. 1, the radio battery 120 was electrically coupled to a radio receiver 122 and may also be used to power individual servos 126A, 126B . . . 126n (e.g., three servos are shown but the actual number is dependent upon the particular application). The radio receiver 122 and the servos 126A, 126B . . . 126n all generally operated at lower overall power levels than the motor 114.

A driver or user may provide a throttle input to a handheld transmitter (not shown) and the throttle input is sent via a radio link to the radio receiver 122. The radio receiver 122 converts the throttle input into a throttle command 124 that is further provided to the throttle control 112. The throttle control 112 regulates the current according to the throttle command 124 and the motor battery 110 supplies the regulated current to the motor 114 in order to accelerate the R/C vehicle.

The radio receiver 122 in this example used one servo 126A for throttle control 112. However, other servos 126B . . . 126n may be used for steering or other functions associated with a particular R/C vehicle application. In some cases, these functions include lights, sounds, other moving parts, and many other functions depending upon the R/C vehicle type and complexity.

Many early R/C vehicle power control systems 100 used two batteries 110, 120, to satisfy the divergent requirements of the relatively high power demands of the motor 114, and the more consistent, lower power demands of the radio receiver 122 and servos 126A, 126B . . . 126n. The motor battery 110 could be bigger in size and provide a relatively larger amount of stored energy in order to maximize time running the R/C vehicle and supply the wide ranging current demands for peak performance. The radio battery 120 could be smaller (e.g., in some cases, multiple AA batteries performed this function) and contain a significantly lower amount of stored energy.

Figure 2:
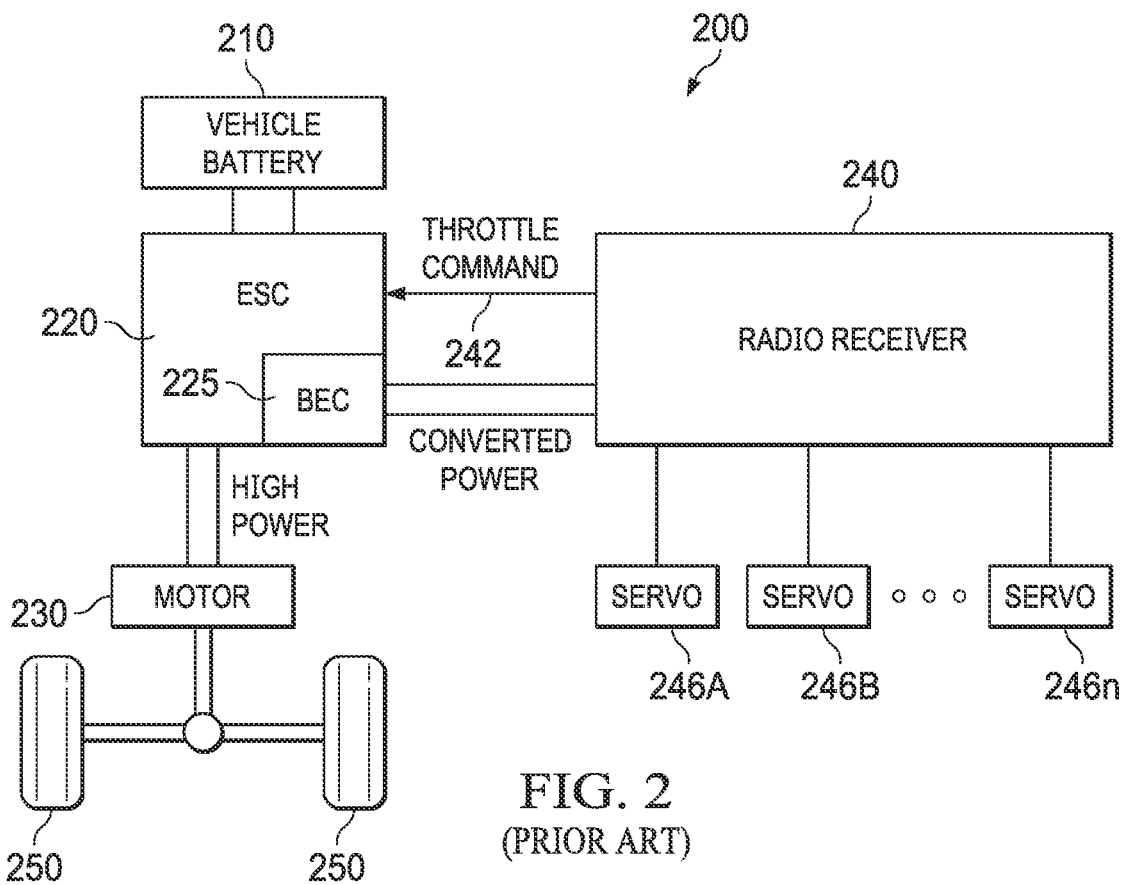
FIG. 2 is a PRIOR ART schematic illustration of a previous power control system using a single battery and electronic speed control.

Turning now to PRIOR ART FIG. 2, this power control system 200 schematic is illustrative of an additional step in the evolution of an R/C vehicle power control system 200. R/C vehicles are usually scale models and typically no larger than ⅒ to ⅕ the size of full size passenger vehicles. Therefore, packaging and space constraints within an R/C vehicle have to be optimized. In the previous power control system 100, two batteries and two separate power systems required a large volume of the interior space of the R/C vehicle and resulted in unnecessary complexity and weight.

As shown in FIG. 2, one solution is to use a single R/C vehicle battery (i.e., such as the high voltage motor battery 110 of FIG. 1, referenced here as 210), and convert or transform a portion of the higher voltage levels required by the motor 230 down to the lower voltage levels appropriate for the rest of the vehicle's electronics (i.e., the radio receiver, servos, etc.). A battery eliminator circuit (BEC) 225 was developed in order to take the power input from the vehicle battery 210 and reduce it to a converted power output suitable for the radio receiver and other vehicle electronics. The BEC 225 is called this due to the elimination of the need for the separate radio battery 120 of FIG. 1.

The power control system 200 therefore includes a single vehicle battery 210 electrically coupled to an electronic speed controller (ESC) 220. The ESC 220 takes over the function of the previously described throttle control 112. However in this figure, the ESC 220 also contains the battery eliminator circuit (BEC) 225. The high power supply to the motor 230 is managed by the ESC 220 and the converted power supply to the radio receiver 240 is managed by the BEC 225.

As with the previous examples, the motor 230 is configured to receive relatively high levels of current at peak demand (i.e., speeds, or high torque) while the radio receiver 240 has a more consistent and lower power consumption. The motor 230 uses the high power to direct to the drive system 250 (e.g. such as wheels for a car or truck, or the propeller for a boat or rotocopter), while the radio receiver 240 controls and regulates the converted power output for the individual servos 246A, 246B . . . 246n in addition to communicating with the hand-held transmitter (not shown). For example, the radio receiver 240 receives a throttle input from the hand-held transmitter or radio controller and provides a throttle command 242 to the ESC 220.

During operation of the R/C vehicle, the BEC 225 may experience a voltage drop in power input as the vehicle battery 210 supplies a high power to the motor 230 when the vehicle battery 210 is nearly depleted. Under these conditions the vehicle battery 210 voltage can drop below the minimum input voltage required for the BEC 225 circuit (e.g., such as due to a low voltage drop off (LVDO) for a switching voltage regulator for example). This may cause the BEC 225 to stop outputting converted power output for a brief period of time. In practical terms, the operator of the R/C vehicle may notice a brief loss of power (i.e., or acceleration) or a stuttering in the R/C vehicle's performance as the voltage from the vehicle battery 210 fluctuates and the various circuit components cycle on and off.

This stuttering may be due to a trend towards the use of microcontrollers and Micro-Electro-Mechanical Systems (MEMS) as part of the vehicle electronics. After even a momentary power loss, the microcontrollers and MEMS require time to revive to their previous level of functionality and R/C vehicle control. Further, modern R/C vehicle drive motors 230 and steering servos 246A, 246B . . . 246n tend to draw more power than the prior art versions and this results in a higher demand on the BEC 225 voltage regulators. As stated previously, all of these factors may combine to result in intermittent interruptions in converted power output flowing from the BEC, which consequently could interrupt the throttle command 242 to the ESC 220, which in turn could result in a stuttering performance of the motor 230.

In conventional BEC's 225, there is typically a switching regulator converting the power input into the converted power output. A switching regulator is a relatively common regulator topology widely used in electronic equipment. Further, a switching regulator has the ability to very efficiently and precisely regulate or convert voltage from a high input voltage (e.g., such as the high input voltage levels from the vehicle battery 210 that are required to power the motor 230) to the lower voltage typically required for the other vehicle electronics, such as a radio receiver 240 and servos 246A, 246B . . . 246n for examples.

Due to the switching regulator's energy conversion based design, switching regulators can operate at a very high efficiency without the need for extensive thermal management. However, switching regulators may not operate at the low voltages that are sometimes experienced during the R/C vehicle's operation. These low voltages commonly occur when a high throttle command 242 is generated while using a vehicle battery 210 that has been used and is nearly discharged or depleted. The low voltage of the vehicle battery 210 may fall below the switching regulator's LVDO with a resulting momentary interruption in the converted power output supplied to the radio receiver 240 and servos 246A, 246B . . . 246n.

As the R/C vehicle experiences these momentary power interruptions during low voltage periods, there may be low voltage induced stuttering of the R/C vehicle's motor 230 as the microcontrollers and/or MEMS of the BEC 225 are shut down and experience a temporary delay when powering back up. The low voltage induced stuttering may cause an unacceptable or disappointing experience for the user or operator of the R/C vehicle.

Figure 3:
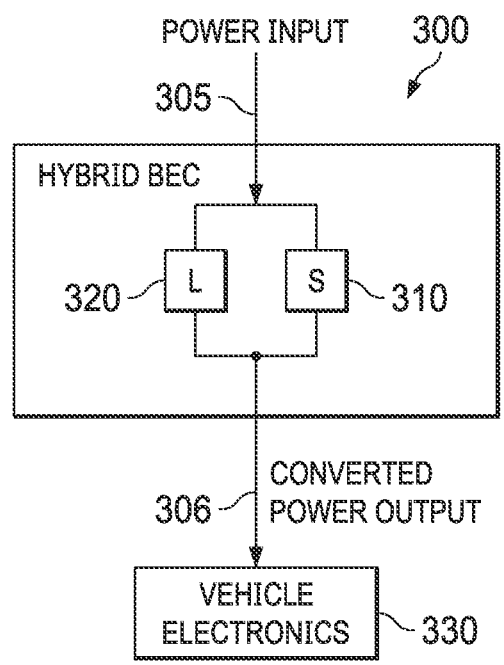
FIG. 3 is a schematic illustration of a hybrid Battery Elimination Circuit (BEC)

Referring now to FIG. 3, this simplified schematic shows an embodiment of a hybrid BEC 300. This is referred to as a hybrid BEC 300 because the hybrid BEC 300 contains a switching regulator 310 connected in parallel with a linear regulator 320, which are further connected to a power input 305 and a converted power output 306. As in other BECs 225, the power input 305 is supplied to the hybrid BEC 300 from the model vehicle battery 210 (not shown in this figure). The converted power output 306 produced by either the switching regulator 310 or the linear regulator 320 is provided to the vehicle electronics 330 (e.g., such as the radio receiver 240, servos 246A, 246B . . . 246n, lights, etc.).

Hybrid ESCs 300 may be configured this way in an attempt to resolve low voltage induced stuttering and additional potential issues not expressly defined. The linear regulator 320 is better suited for the instances of the model vehicle battery's 210 low voltage operation due to a relatively simple internal design and an ability to continue to produce a converted power output 306 even if a minimum power input 305 voltage level is not achieved. A linear regulator 320 complements the switching regulator's 310 relatively better ability to convert a model vehicle's 210 high voltage power input 305 into a converted power output 306. And the linear regulator 320 does not have the limitations of a low voltage drop off (LVDO) present in the switching regulator 310.

Use of the linear regulator 320 and the switching regulator 310 in parallel allows the hybrid BEC 300 to operate during conditions that better suited for each regulator (310, 320). The switching regulator 310 can operate during a majority of the main operating cycle of an R/C vehicle. The main operating cycle generally occurs from the point of a fully charged model vehicle battery 210 until the vehicle battery 210 is nearer to a fully discharged or a depleted state (e.g., over ¾, ⅘, or ⅚'s depletion of stored energy depending upon the chemistry and the life cycle of the vehicle battery 210). During the majority of the main operating cycle, the power input 305 is higher and the converted power output 306 is stable.

Conversely, if the operation of the linear regulator 320 occurred during the main operating cycle of an R/C vehicle, there may be a risk of burning out the linear regulator 320. The linear regulator 320 may burn out during periods of high converted power output 306, such as may occur when there is a fully charged vehicle battery 210 and a high converted power output 306 demand for a steering servo trying to move jammed or stuck front steering wheels, for example.

The switching regulator 310 may have a low voltage drop out (LVDO) which functions to shut off the switching regulator 310 when the vehicle battery 210 is operating at a momentarily low voltage level, enabling the linear regulator 320 to function during this type of situation. Certain vehicle battery 210 types may be more susceptible to having the voltage fluctuate during partial discharge and high current demands. For example, nickel metal hydride (NiMH) batteries, nickel cadmium (NiCAD) batteries, and low quality lithium polymer (LiPo) (among others) may exhibit wide voltage level fluctuations during times when the amount of stored energy remaining in the vehicle battery 210 is low, and the current demand of the vehicle electronics 300 is high.

Figure 4:
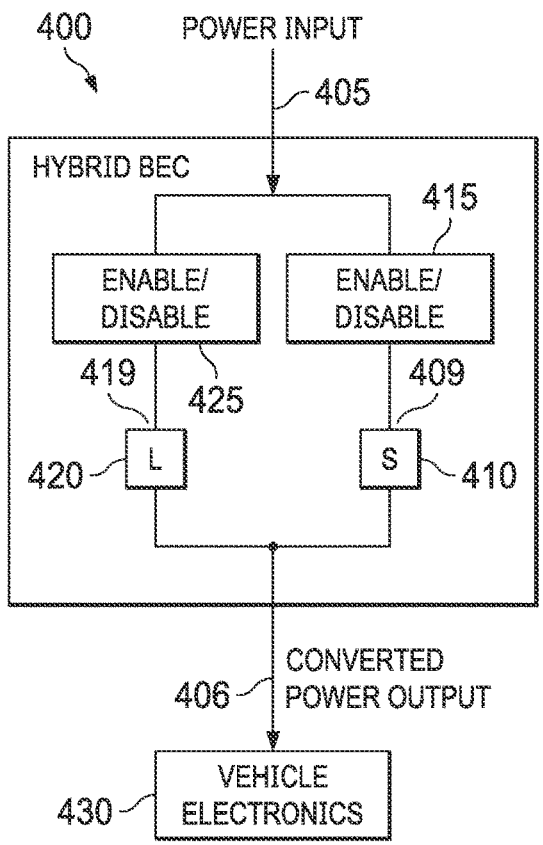
FIG. 4 is a schematic illustration of an enhanced hybrid BEC with the inclusion of enable/disable systems, according to an embodiment of the disclosure.

Referring generally to FIG. 4, this simplified schematic shows an embodiment of an enhanced hybrid BEC 400 with enable/disable systems 415, 425. A switching enable/disable system 415 is provided for the switching regulator 410, and a linear enable/disable system 425 is provided for the linear regulator 420. Power input 405 may be provided to the enhanced hybrid BEC 400 (e.g., such as from a model vehicle battery 210) and then delivered to the vehicle electronics 430 (e.g., such as the radio receiver 240, servos 246A, 246B . . . 246n, etc.) as a converted power output 406 (e.g., an appropriate converted voltage level).

The switching enable/disable system 415 and the linear enable/disable system 425 are provided to allow or inhibit current flow to either of the corresponding switching regulator 410 and linear regulator 420. The switching enable/disable system 415 is positioned between the power input 405 and a switching input 409 of the switching regulator 410 and the linear enable/disable system 425 is positioned between the power input 405 and a linear input 419 of the linear regulator 420. The switching enable/disable system 415 and the linear enable/disable system 425 may be operated via a direct instruction, or in correspondence to the voltage levels of the power input 405 and/or the required voltage levels of the converted power output 406. Switching enable/disable systems 415 and linear enable/disable systems 425 may comprise metal oxide semi-conductor field effect transistors (MOSFET), transistors, or other systems internal to each of the regulators (410, 420), among others.

When the voltage levels (e.g., such as the voltage levels of the power input 405 and/or the required voltage level of the converted power output 406) are above a predetermined voltage threshold (e.g., such as when the model vehicle battery 210 is fresh and operating at full capacity), the switching enable/disable system 415 allows or enables the power input 405 to flow to the switching input 409 of the switching regulator 410. In this situation, the linear enable/disable system 425 inhibits or disables the power input 405 from flowing to the linear input 419 of the linear regulator 420.

As an R/C vehicle is operated, the stored energy of the model vehicle battery 210 is depleted or discharged, and the voltage level may fall to or below a predefined input voltage threshold. At this point, the linear enable/disable system 425 allows or enables the power input 405 to flow to the linear input 419 of the linear regulator 420. In addition, the switching enable/disable system 415 inhibits or disables the power input 405 from reaching the switching input 409 of the switching regulator 410.

The use of the switching enable/disable system 415 and the linear enable/disable systems 425 allow the switching regulator 410 and the linear regulator 420 to each be used at their more appropriate voltage levels. Enabling the linear regulator 420 to function at the lower voltage levels of the vehicle battery 210 also helps to avoid the LVDO threshold limit of the switching regulator 410. Avoiding the LVDO threshold limit also helps to minimize or reduce any resulting stuttering effects that may otherwise occur when the switching regulator 410 reaches the LVDO threshold limit.

Use of these switching enable/disable system 415 and the linear enable/disable systems 425 in an enhanced hybrid BEC 400 may result in a higher level of electrical efficiency over a hybrid BEC 300 operating without these systems. In addition, use of these enable/disable systems (415, 425) allows for a more direct control over the switching regulator 410 and linear regulator 420.

Shutting off or disabling both the switching enable/disable system 415 and the linear enable/disable system 425 shuts down or disables the enhanced hybrid BEC 400. Disabling both the switching enable/disable system 415 and the linear enable/disable system 425 may happen when an R/C vehicle is not going to be used for an extended period of time. The total shutdown may prevent parasitic loads from further draining an R/C vehicle's battery, such as the vehicle battery 210.

Figure 5:
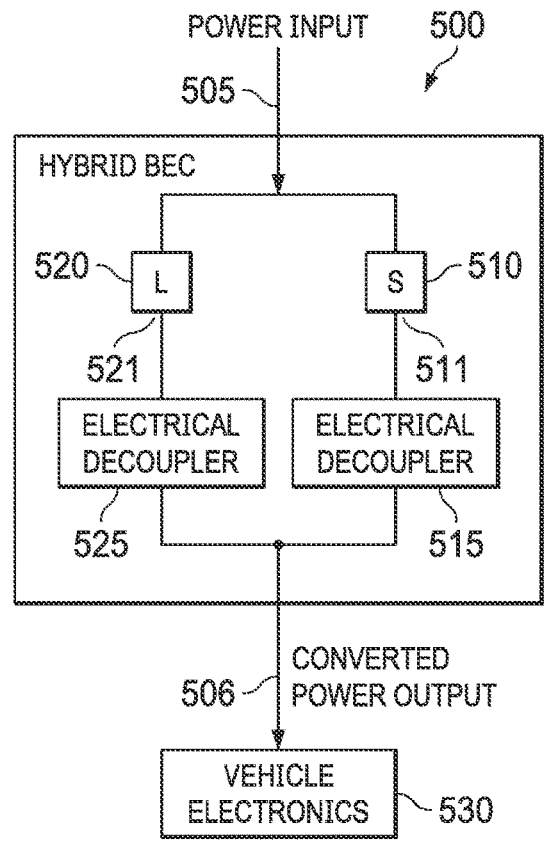
FIG. 5 is a schematic illustration of an enhanced hybrid BEC with the inclusion of electronic decouplers, according to an embodiment of the disclosure.

Referring to FIG. 5, this simplified schematic shows another embodiment of an enhanced hybrid BEC 500. The enhanced hybrid BEC 500 comprises electrical decoupling systems (515, 525), specifically, a switching electrical decoupler 515 and a linear electrical decoupler 525. The enhanced hybrid BEC 500 also comprises a switching regulator 510 electrically coupled in parallel to a linear regulator 520.

The switching enable/disable system 515 is provided between a switching output 511 of the switching regulator 510 and the converted power output 506. While the linear enable/disable system 525 is provided between a linear output 521 of the linear regulator 520 and the converted power output 506. Embodiments of the switching electrical decoupler 515 and the linear electrical decoupler 525 may comprise metal oxide semi-conductor field effect transistors (MOSFET), diodes, or relays, among others for example.

Generally, a power input 505 is provided to the enhanced hybrid BEC 500 (e.g., such as from a model vehicle battery 210) and converted to an appropriate converted power output 506 before being provided to the vehicle electronics 530 (e.g. such as the radio receiver 240, servos 246A, 246B . . . 246n, etc.). The converted power output 506 is coupled to vehicle electronics 530 via either the switching output 511 or the linear output 521 depending upon appropriate operating parameters or external controls. For example, the appropriate operating parameters may be the input voltage level at the power input 505 and/or the required output voltage levels at the converted power output 506, among others.

When a voltage level (e.g., such as the voltage level determined from the input power 505) is greater than a predetermined voltage threshold, the linear electrical decoupler 525 decouples the linear output 521 of the linear regulator 520 from the converted power output 506. In this case, the switching electrical decoupler 515 couples the switching output 511 to the converted power output 506. The converted power output 506 from the switching regulator 510 is then provided to the vehicle electronics 530.

Conversely, when the monitored voltage level of the power input 505 is equal to or less than a predetermined voltage threshold, the switching electrical decoupler 515 decouples the switching output 511 of the switching regulator 510 from the converted power output 506. Further, the linear electrical decoupler 525 couples the linear output 521 of the linear regulator 520 to the converted power output 506. The linear output 521 from the linear regulator 520 is then provided as the converted power output 506 to the vehicle electronics 530.

Use of the switching electronic decoupler 515 and the linear electronic decoupler 525 in conjunction with the corresponding switching regulator 510 and linear regulator 520 and operating in parallel allows the enhanced hybrid BEC 500 to increase efficiency from any potential undesired interactions between the switching regulator 510 and the linear regulator 520.

Figure 6:
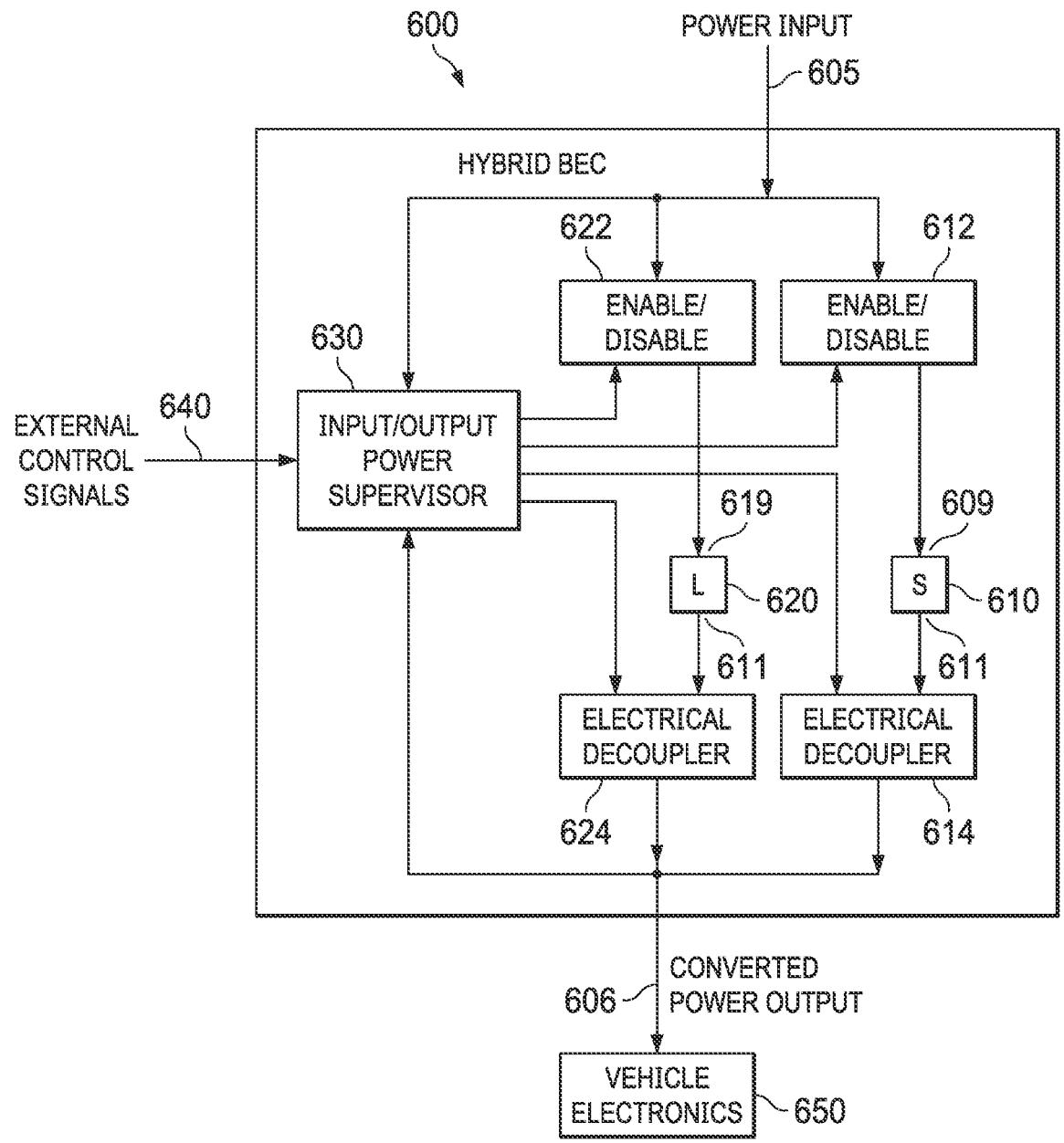
FIG. 6 is a schematic illustration of an enhanced hybrid BEC with the inclusion of enable/disable systems, electronic decouplers, and an input/output power supervisor, according to an embodiment of the disclosure.

Referring to FIG. 6, this simplified exemplary schematic shows another embodiment of an enhanced hybrid BEC 600 with enable/disable systems (612, 622), electronic decoupling systems (614, 624), and an input/output power supervisor 630. The enable/disable systems comprise a switching enable/disable system 612 and a linear enable/disable system 622. The electronic decoupling systems comprise a switching electronic decoupler 614 and a linear electronic decoupler 624.

The enhanced hybrid BEC 600 further comprises a switching regulator 610 with a switching enable/disable system 612 provided between the power input 605 and a switching input 609 of the switching regulator 610. The switching electrical decoupler 614 is provided between a switching output 611 of the switching regulator 610 and the converted power output 606 of the enhanced hybrid BEC 600.

The enhanced hybrid BEC 600 also comprises a linear regulator 620 with a linear enable/disable system 622 provided between the power input 605 and a linear input 619 of the linear regulator 620. The linear electronic decoupler 624 is provided between a linear output 621 of the linear regulator 620 and the converted power output 606 to the vehicle electronics 650.

A supervisory control system, such as the input/output power supervisor 630 shown in the figure for example, may also be provided in this embodiment of an enhanced hybrid BEC 600. The input/output power supervisor 630 may have inputs for the power input 605, the converted power output 606, and external control signals 640, as well as other potential variations depending upon application. The input/output power supervisor 630 may have outputs for the enable/disable systems (612, 614) and the electrical decouplers (614, 624), as well as other potential variations depending upon application.

The input/output power supervisor 630 may use these three inputs and four outputs to control the enable/disable systems (612, 622) and/or the electrical decouplers (614, 624). As a result, the input/output power supervisor 630 may determine whether the power input 605 will ultimately be converted by the switching regulator 610 or the linear regulator 620 into the converted power output 606 provided to the vehicle electronics 650 (such as the radio receiver, servos, etc.).

In one embodiment, the input/output power supervisor 630 may select the switching regulator 610 or the linear regulator 620 based on the operational parameters of various components of the power systems 200 of an R/C vehicle. Some operational parameters for example may include the input voltage level of the power input 605 and the required output voltage level of the converted power output 606. Monitoring the voltage levels of the power input and/or the converted power output may effectively indicate the relative condition and state of charge (i.e., stored energy capacity remaining) of the model vehicle battery 210. For example, a model vehicle battery 210 with fluctuating and relatively low voltage readings is most likely near depletion of any stored charge.

The voltage levels may be compared against predetermined voltage thresholds. If the monitored voltage levels are above predetermined voltage thresholds, then the input/output power supervisor 630 may instruct the switching enable/disable system 612 to enable the power input 605 to flow to the switching input 609 of the switching regulator 610, and further instruct the switching electrical decoupler 614 to couple the switching output 611 of the switching regulator 610 to the converted power output 606. In addition, the input/output power supervisor 630 may instruct the linear enable/disable system 622 to disable the power input 605 to the linear input 619 of the linear regulator 620, and further instruct the linear electrical decoupler 624 to decouple the linear output 621 of the linear regulator 620 from the converted power output 606. The power input 605 would therefore be converted by the switching regulator 610 before exiting the enhanced hybrid BEC 600 as a converted power output 606.

If the monitored voltage levels are below predetermined voltage thresholds, then the input/output power supervisor 630 may instruct the switching enable/disable system 612 to disable the power input 605 to the switching input 609 of the switching regulator 610, and instruct the switching electrical decoupler 614 to decouple the switching output 611 of the switching regulator 610 from the converted power output 606. Further, the input/output power supervisor 630 may instruct the linear enable/disable system 622 to enable the power input 605 to flow to the linear input 619 of the linear regulator 620, and instruct the linear electrical decoupler 624 to couple the linear output 621 of the linear regulator 620 from the converted power output 606. In this case, the power input 605 may be converted by the linear regulator 620 before exiting the enhanced hybrid BEC 600 as a converted power output 606.

The input/output power supervisor 630 may also respond to external control signals 640 to operate the enable/disable systems (612, 622) and/or the electrical decouplers (614, 624). For example, both of the enable/disable systems (612, 622) may be disabled and both of the electrical decouplers (614, 624) may be decoupled in order to totally shut down the enhanced hybrid BEC 600 and/or the associated ESC.

Use of both an enable/disable system (612, 622) with a corresponding electrical decoupler (614, 624) to convert a power input 605 into a converted power output 606 by selecting one of the switching regulator 610 or the linear regulator 620, may increase the operational electrical efficiency of the enhanced hybrid BEC 600 by minimizing parasitic electrical loads from the unused regulator (610, 620).

Use of various combinations of the components as shown in the exemplary embodiment of the enhanced hybrid BEC 600 in conjunction with the linear regular 620 and the switching regulator 610 operating in parallel, allow the enhanced hybrid BEC 600 to inherit some features from the enhanced hybrid BEC 400 and the enhanced hybrid BEC 500. In addition, the enhanced hybrid BEC 600 may benefit from the input/output power supervisor 630 system that controls the enable/disable systems (612, 622) and the electrical decouplers (614, 624). The input/output power supervisor 630 system may provide an increased response to rapidly fluctuating battery voltages.

Figure 7:
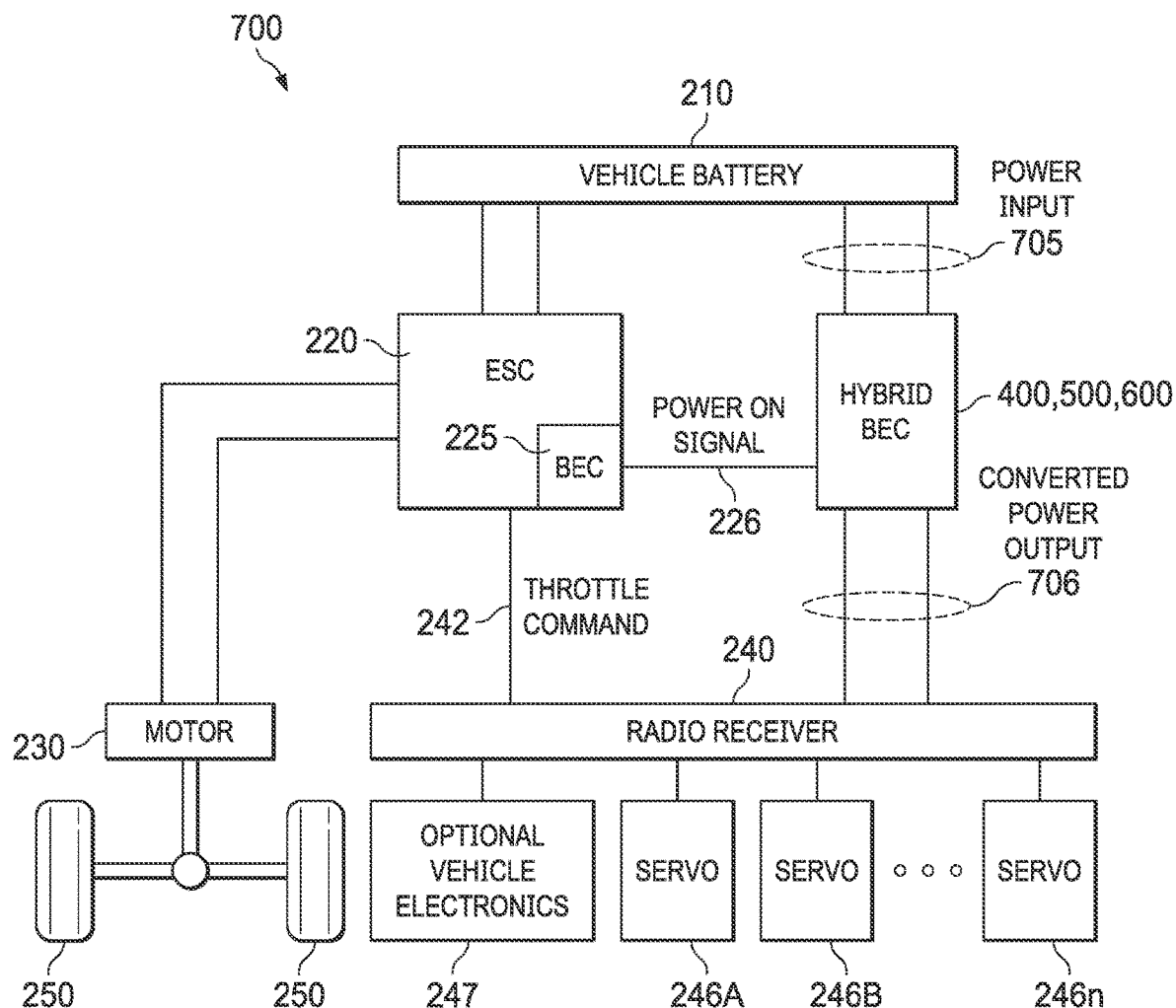
FIG. 7 is a schematic illustration of an external enhanced hybrid BEC incorporated into a conventional R/C vehicle power control system, according to an embodiment of the disclosure.

Referring generally to FIG. 7, in this illustrative schematic, an embodiment is shown of an R/C vehicle power control system 700 using an external enhance hybrid BEC 400, 500, 600. As described previously with regards to Prior Art FIG. 2, a vehicle battery 210 provides power input to an ESC 220 containing a conventional BEC 225. However, instead of using the conventional BEC 225 to provide a converted power output to the vehicle electronics such as the radio receiver 240 and servos 246A, 246B . . . 246n, the conventional BEC 225 instead provides a power on signal 226 (e.g., such as a signal or communication, reaching and/or surpassing a voltage level, or reaching and/or surpassing a current level, among others) to an embodiment of an enhanced hybrid BEC 400, 500, 600.

As in the previous embodiments, the external enhanced hybrid BEC 400, 500, 600 receives power input 705 either directly or indirectly from the vehicle battery 210 (e.g., directly from the vehicle battery 210 is shown in this illustrative embodiment). Upon receiving the power on signal 226, the external enhanced hybrid BEC 400, 500, 600 may then provide the converted power output 706 to the radio receiver 240 and various servos 246A, 246B . . . 246n, as well as any other optional vehicle electronics 247 (e.g., such as speakers, lights, self-righting devices, winches, and other accessories or components, either directly from the external hybrid BEC 400, 500, 600 or indirectly via the radio receiver 240). In this example, the optional vehicle electronics 247 are shown as being powered indirectly via the radio receiver 240.

Since many R/C vehicles receive extensive modification and customization from their users or operators, the external enhanced hybrid BEC 400, 500, 600 is provided in order to provide increased or higher levels of power and current for optional and/or aftermarket high powered servos, lighting, and/or other optional vehicle electronics 247. The conventional BEC 225 may not be able to adequately power one or all of these higher powered components. As shown in the R/C vehicle power control system 700, a conventional prior art power control system 200 may be modified to use an external enhanced hybrid BEC 400, 500, 600 to convert and provide converted power output 706 to a radio receiver 240, servos 246A, 246B . . . 246n, and optional vehicle electronics 247, increasing the ability of an R/C vehicle to be modified to a user's or operator's preferences and needs.

In order to modify a conventional prior art power control system 200, an embodiment of an external enhanced hybrid BEC 400, 500, 600, may be electrically coupled to the vehicle battery 210 and to the vehicle electronics (e.g., radio receiver 210, servos 246A, 246B . . . 246n, and optional vehicle electronics 247). When the R/C vehicle is powered up, the conventional BEC 225 sends a power on signal to the external enhanced hybrid BEC 400, 500, 600. The external enhanced hybrid BEC 400, 500, 600 then provides converted power output 706 to the vehicle electronics in a manner previously described. The conventional BEC 225 may then be decoupled from the vehicle electronics.

This modification may reduce or inhibit stuttering that may otherwise occur while operating an R/C vehicle when using a partially depleted vehicle battery 210, such as a NiMH battery for example, and a conventional BEC 225. The use of the switching and linear regulators (410, 420, 510, 520, 610, and 620) avoids the low voltage drop-out (LVDO) of the switching regulators (410, 510, and 610) and allows the linear regulator (420, 520 and 620) to continue powering the vehicle electronics during periods of low voltage produced by the vehicle battery 210.

Figure 8:
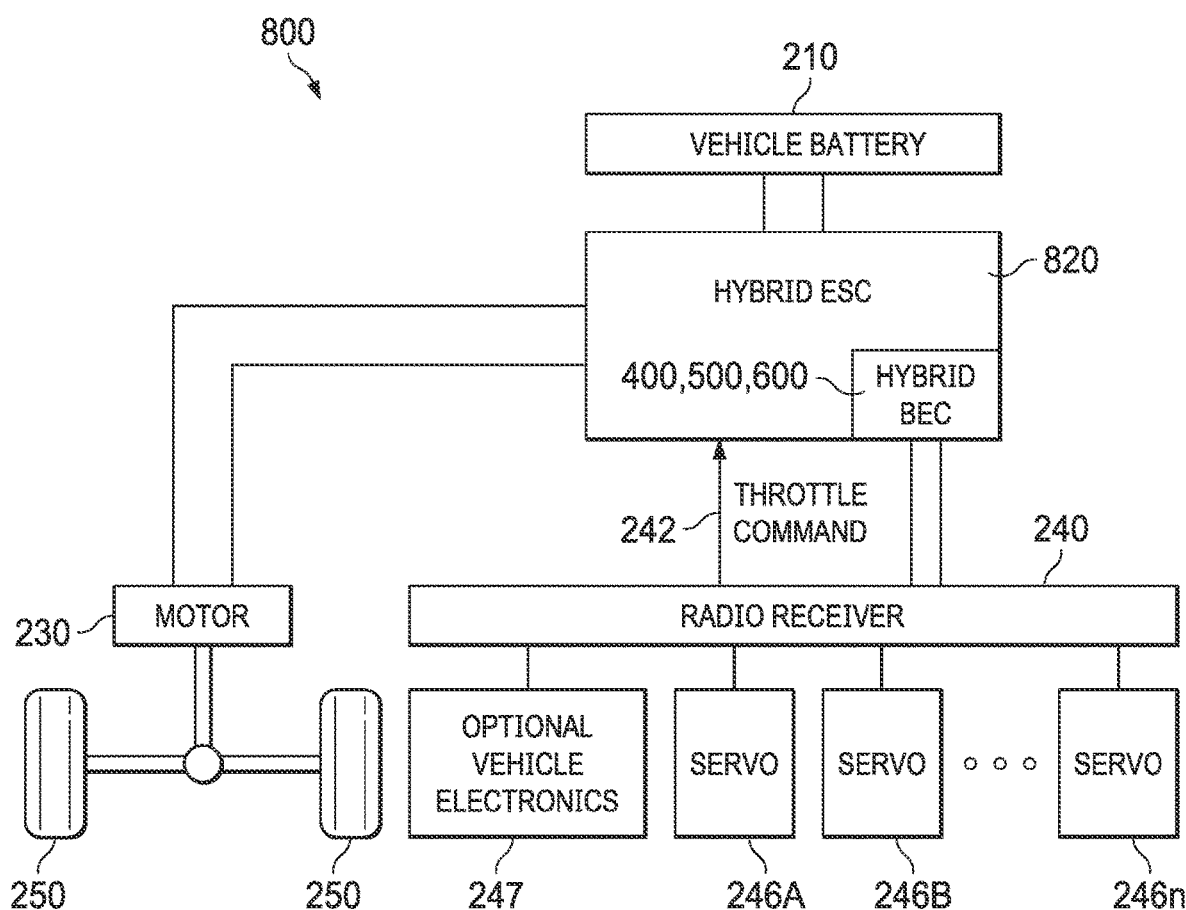
FIG. 8 is a schematic illustration of an internal enhanced hybrid BEC incorporated into an R/C vehicle power control system containing a hybrid Electronic Speed Controller (ESC), according to an embodiment of the disclosure.

Turning now to FIG. 8, in this illustrative schematic, another embodiment of a model vehicle power control system 800 is shown using the teachings of this disclosure. In this case, the conventional ESC 220 with an internal BEC 225 has been replaced with a hybrid ESC 820. The hybrid ESC 820 may use a conventional ESC 220 with an internal enhanced hybrid BEC 400, 500, 600, in place of the conventional BEC 225.

In this type of R/C vehicle power control system 800, the circuitry of a hybrid ESC 820 may incorporate an internal enhanced hybrid BEC 400, 500, 600 from the initial stages of the hybrid ESC 820 design process. Accordingly, the hybrid ESC 820 reduces the need for an external enhanced hybrid BEC 400, 500, 600 as a separate component and avoids the unnecessary duplication of having a conventional BEC 225 and an external enhanced hybrid BEC 400, 500, 600 in one vehicle.

The hybrid ESC 820 may take up less space within the R/C vehicle than the combination of the ESC 220 and an external enhanced hybrid BEC 400, 500, 600, and may therefore increase the packaging efficiency. The single component hybrid ESC 820 may also be easier to waterproof than the individual ESC 220 and the external enhanced hybrid BEC 400, 500, 600 components. Using an internal enhanced hybrid BEC 400, 500, 600 within a package with an ESC may reduce the number of external connections or ports that would otherwise be necessary for fully connecting two individual and separate components.

In this embodiment, the vehicle battery 210 is electrically coupled directly to the hybrid ESC 820. The hybrid ESC 820 controls the power supply to the motor 230 and drive system 250, while the internal enhanced hybrid BEC 400, 500, 600 controls the power supply to the vehicle electronics (e.g., radio receiver 240, servos 246A, 246B . . . 246n, and optional vehicle electronics 247). The radio receiver 240 receives a throttle input from a hand-held transmitter (not shown) and provides a throttle command 242 to the hybrid ESC 820.

Figure 9:
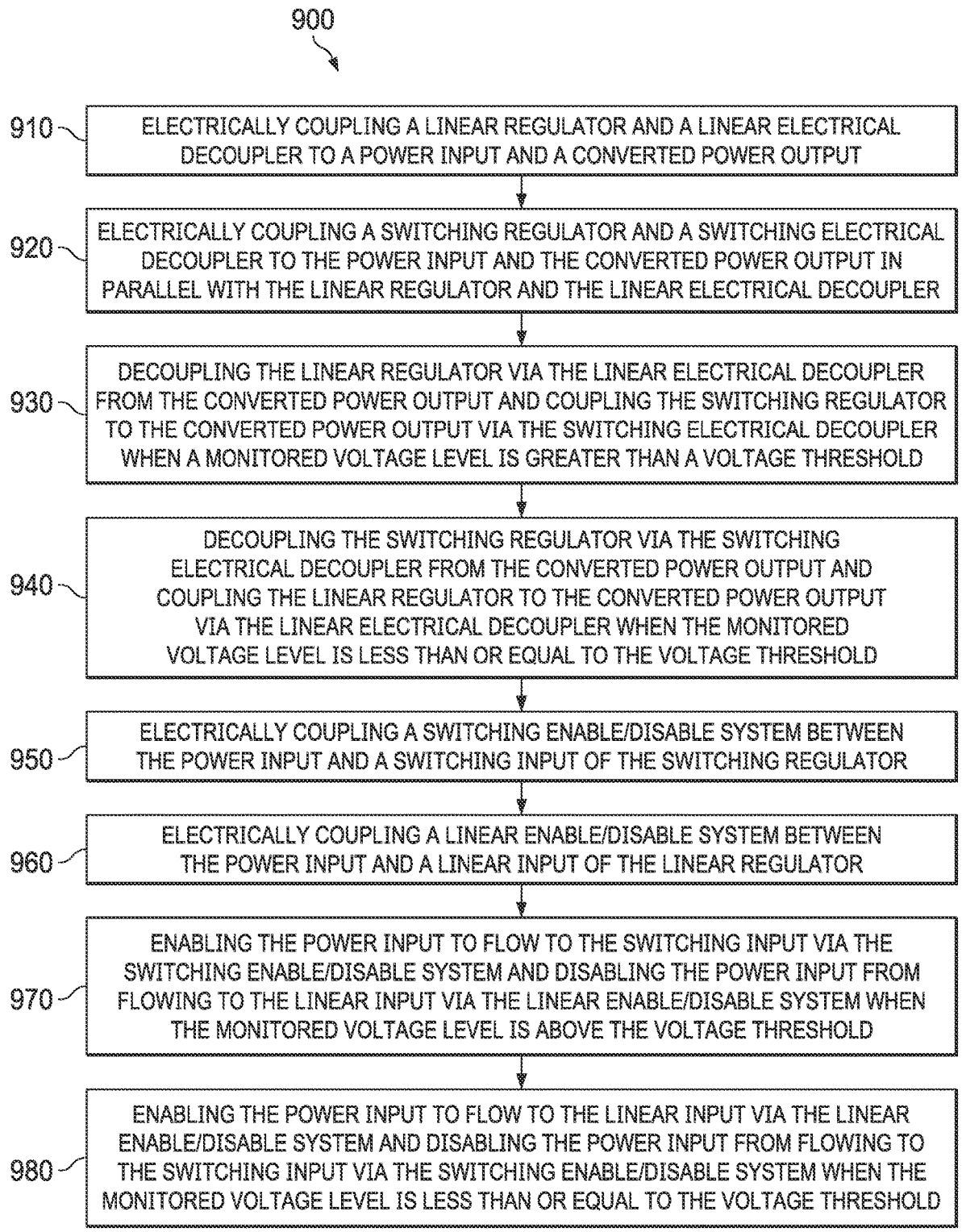
FIG. 9 is an illustrative flowchart of a method for producing a converted power output for an R/C vehicle, according to an embodiment of the disclosure.

Referring generally to FIG. 9, this figure shows an illustrative flowchart describing a process for producing or providing a converted power output for an R/C vehicle 900. In some embodiments of the process, electrically coupling a linear regulator and a linear electrical decoupler to a power input and the converted power output 910. The linear electrical decoupler is provided between a linear output of the linear regulator and the converted power output.

The process may additionally include electrically coupling a switching regulator and a switching electrical decoupler to the power input and the power output in parallel with the linear regulator and the linear electrical decoupler 920. The switching electrical decoupler is provided between a switching output of the switching regulator and the converted power output.

The process may further include decoupling the linear regulator via the linear electrical decoupler from the power output and coupling the switching regulator to the converted power output via the switching electrical decoupler when a monitored voltage level is greater than a voltage threshold 930. Also, decoupling the switching regulator via the switching electrical decoupler from the converted power output and coupling the linear regulator via the linear electrical decoupler to the converted power output when the monitored voltage level is less than or equal to the voltage threshold 940.

In other embodiments, the process further includes electrically coupling a switching enable/disable system between the power input and a switching input of the switching regulator 940 and electrically coupling a linear enable/disable system between the power input and a linear input of the linear regulator 950. The switching enable/disable system, switching regulator, and switching electrical decoupler are provided in parallel to the linear enable/disable system, linear regulator, and the linear electrical decoupler.

The process may also include enabling the power input to flow to the switching regulator via the switching enable/disable system and disabling the power input from flowing to the linear regulator via the linear enable/disable system when the monitored voltage level is above the voltage threshold 960. In addition, enabling the power input to flow to the linear regulator via the linear enable/disable system and disabling the power input from flowing to the switching regulator via the enable/disable system when the monitored voltage level is less than or equal to the voltage threshold 970.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An enhanced hybrid battery elimination circuit for a radio controlled vehicle comprising:
    a linear regulator:
    a switching regulator connected in parallel to the linear regulator between a power input and a converted power output;
    a switching enable/disable system provided between the power input and the switching regulator;
    a linear enable/disable system provided between the power input and the linear regulator;
    a switching electrical decoupler provided between the switching regulator and the converted power output;
    a linear electrical decoupler provided between the linear regulator and the converted power output;
    wherein the switching enable/disable system enables the power input to flow to the switching regulator and the switching electrical decoupler couples the switching regulator from the converted power output and the linear enable/disable system disables the power input from flowing to the linear regulator and the linear electrical decoupler decouples the linear regulator from the converted power output when a monitored voltage level is above a voltage threshold; and
    wherein the linear enable/disable system enables the power input to flow to the linear regulator and the linear electrical decoupler couples the linear regulator to the converted power output and the switching enable/disable system disables the power input from flowing to the switching regulator and the switching electrical decoupler decouples the switching regulator from the converted power output when the monitored voltage level is less than or equal to the voltage threshold.

2. The enhanced hybrid battery elimination circuit as described in claim 1 wherein the monitored voltage level is at the power input.

3. The enhanced hybrid battery elimination circuit as described in claim 1 wherein the monitored voltage level is at the converted power output.

4. The enhanced hybrid battery elimination circuit as described in claim 1, further comprising:
    an input/output power supervisor configured to monitor the input power and the converted output power;
    wherein the input/output power supervisor controls an operation of the switching enable/disable system, the switching electrical decoupler, the linear enable/disable system, and the linear electrical decoupler according to the monitored voltage level.

5. The enhanced hybrid battery elimination circuit as described in claim 4, wherein the input/output power supervisor controls the operation of the switching enable/disable system, the switching electrical decoupler, the linear enable/disable system, and the linear electrical decoupler according to an external command signal regardless of the monitored voltage level.

6. The enhanced hybrid battery elimination circuit as described in claim 1, wherein the enhanced hybrid battery elimination circuit is integrated within an electronic speed control.

7. A radio controlled vehicle including a power control system comprising:
- a power input from a vehicle battery;
- a converted power output to vehicle electronics;
- an enhanced hybrid battery elimination circuit electrically coupled to the power input and providing the converted power output, comprising:
  - a linear regulator;
  - a switching regulator connected in parallel to the linear regulator between the power input and the converted power output;
  - a linear electrical decoupler provided between the linear regulator and the converted power output;
  - a switching electrical decoupler provided between the switching regulator and the converted power output;
  - wherein the switching electrical decoupler couples the switching regulator to the converted power output and the linear electrical decoupler decouples the linear regulator from the converted power output when a monitored voltage level is greater than a voltage threshold; and
  - wherein the linear electrical decoupler couples the linear regulator to the converted power output and the switching electrical decoupler decouples the switching regulator from the converted power output when the monitored voltage level is less than or equal to the voltage threshold.

8. The radio controlled vehicle described in claim 7, wherein the power control system further comprises an electronic speed controller, wherein a battery elimination circuit of the electronic speed controller provides a power on signal to the enhanced hybrid battery elimination circuit.

9. The radio controlled vehicle described in claim 8, wherein the power on signal is a voltage reading at least equal to a power on voltage threshold.

10. The radio controlled vehicle described in claim 7, wherein at least one of the switching electrical decoupler and the linear electrical coupler is a metal oxide semiconductor field effect transistor (MOSFET).

11. The radio controlled vehicle described in claim 7, wherein the monitored voltage level is a voltage determined from the power input.

12. A method for providing a converted power output for a radio controlled vehicle comprising:
- electrically coupling a linear regulator and a linear electrical decoupler to a power input and the converted power output, wherein the linear electrical decoupler is provided between a linear output of the linear regulator and the converted power output;
- electrically coupling a switching regulator and a switching electrical decoupler to the power input and the converted power output in parallel with the linear regulator and the linear electrical decoupler, wherein the switching electrical decoupler is provided between a switching output of the switching regulator and the converted power output;
- decoupling the linear output via the linear electrical decoupler from the converted power output and coupling the switching output to the converted power output via the switching electrical decoupler when a monitored voltage level is greater than a voltage threshold;
- decoupling the switching output via the switching electrical decoupler from the converted power output and coupling the linear output via the linear electrical decoupler to the converted power output when the monitored voltage level is less than or equal to the voltage threshold.

13. The method according to claim 12, wherein the monitored voltage level is determined from the converted power output.

14. The method according to claim 12, further comprising:
- electrically coupling a switching enable/disable system between the power input and a switching input of the switching regulator;
- electrically coupling a linear enable/disable system between the power input and a linear input of the linear regulator, wherein the switching enable/disable system, switching input, switching regulator, switching output, and switching electrical decoupler are provided in parallel to the linear enable/disable system, linear input, linear regulator, linear output, and the linear electrical decoupler;
- enabling the power input to flow to the switching input via the switching enable/disable system and disabling the power input from flowing to the linear input via the linear enable/disable system when the monitored voltage level is above the voltage threshold; and
- enabling the power input to flow to the linear input via the linear enable/disable system and disabling the power input from flowing to the switching input via the enable/disable system when the monitored voltage level is less than or equal to the voltage threshold.

15. The method according to claim 12 wherein the monitored voltage level is at the power input.

16. The method according to claim 14, wherein an input/output power supervisor monitors the monitored voltage level and enables or disables the switching enable/disable system and the linear enable/disable system, as well as couples or decouples the switching electrical decoupler and the linear electrical decoupler.

17. The method according to claim 12, wherein the monitored voltage level is at the converted power output.

* * * * *